US009460089B1

(12) United States Patent
Rathod et al.

(10) Patent No.: US 9,460,089 B1
(45) Date of Patent: Oct. 4, 2016

(54) FLOW RENDERING OF ANNOTATION CHARACTERS

(71) Applicant: AMAZON TECHNOLOGIES, INC., Reno, NV (US)

(72) Inventors: Vivek Mansing Rathod, Karnataka (IN); Shanmugapriya Muthamilselvam, Chennai (IN); Satishkumar Kothandapani Shanmugasundaram, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 574 days.

(21) Appl. No.: 13/671,500

(22) Filed: Nov. 7, 2012

(51) Int. Cl.
*G06F 17/00* (2006.01)
*G06F 17/28* (2006.01)
*G06F 3/0484* (2013.01)

(52) U.S. Cl.
CPC ......... *G06F 17/289* (2013.01); *G06F 3/04842* (2013.01)

(58) Field of Classification Search
CPC ............. G06F 17/241; G06F 17/2863; G06F 17/289; G06F 3/04842; G06K 2209/011; G06K 9/00429

USPC ........ 382/176, 186; 715/207, 232, 246, 249, 715/244, 243
See application file for complete search history.

(56) References Cited

U.S. PATENT DOCUMENTS

| 6,128,632 | A  | * | 10/2000 | McCully ........................ 715/234 |
| 6,332,148 | B1 | * | 12/2001 | Paine et al. ................... 715/236 |
| 7,783,472 | B2 | * | 8/2010  | Nagao et al. ...................... 704/2 |
| 8,595,614 | B2 | * | 11/2013 | Kutsumi et al. .............. 715/243 |
| 2002/0116414 | A1 | * | 8/2002 | Tesch et al. .................. 707/515 |
| 2012/0105484 | A1 | * | 5/2012 | Cui .............................. 345/660 |

OTHER PUBLICATIONS

Yasuhiro Anan, W3C Working Group Note Apr. 3, 2012, W3C, 3.3.4-7.*

* cited by examiner

*Primary Examiner* — Manglesh M Patel
(74) *Attorney, Agent, or Firm* — Lowenstein Sandler LLP

(57) ABSTRACT

A method for rendering ruby characters in an electronic document of Japanese and other language text includes identifying a ruby character at a line boundary in a text layout for the electronic document, identifying a type of the ruby character, and, based on the type, repositioning the ruby character and an associated base character within the line or within an adjacent line if the line does not have enough space for the ruby character.

21 Claims, 11 Drawing Sheets

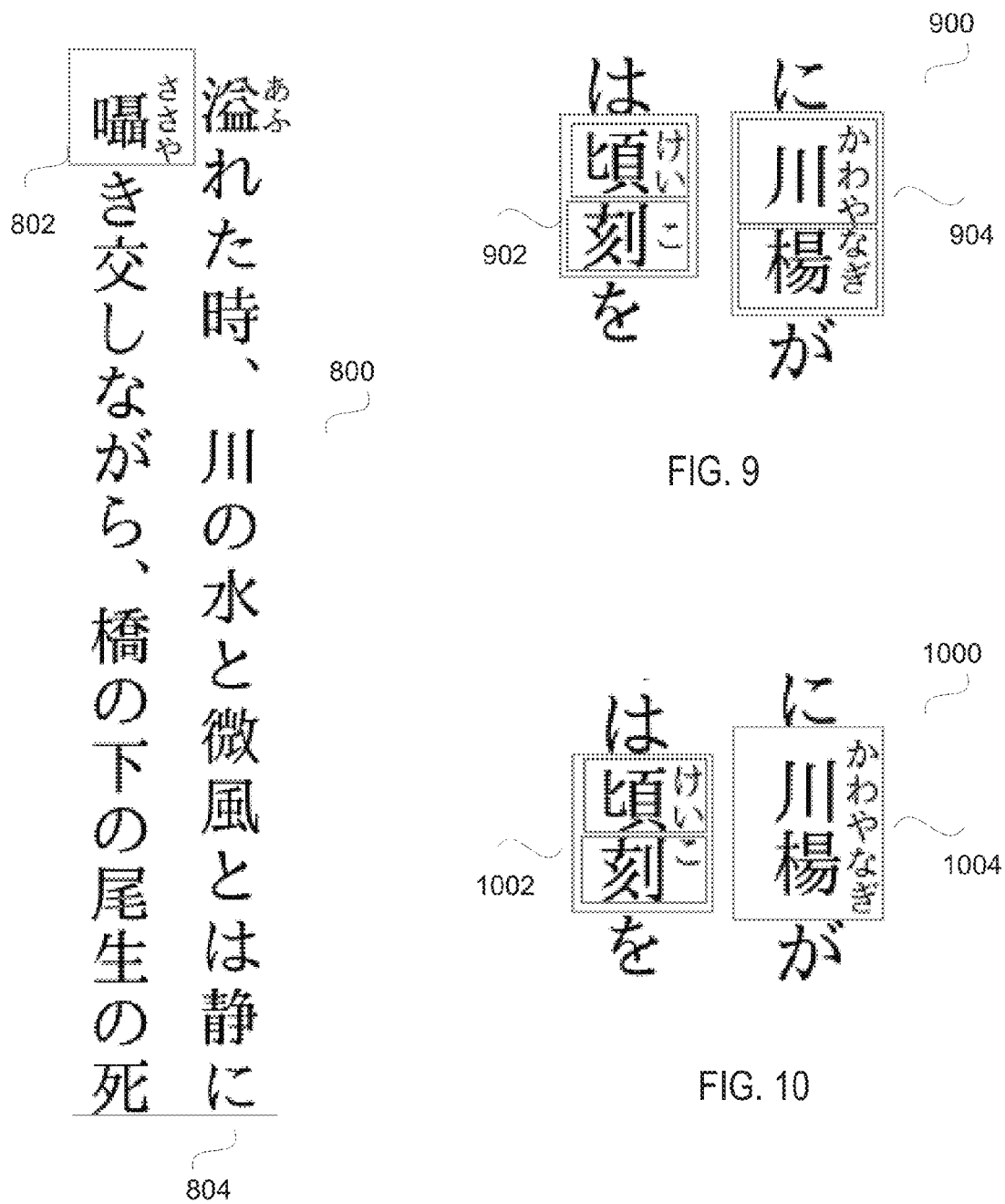

FLOW RENDERING OF ANNOTATION CHARACTERS

BACKGROUND

Japanese and Chinese texts, as well as some other language texts, contain base characters and annotation characters. Ruby characters in Japanese are one specific example of such annotation characters. Annotation characters also exist in other languages. Ruby characters are smaller characters that explain the pronunciation or meaning of the base characters, such as for obscure or difficult base characters. Ruby characters can be an important part of such texts. For example, ruby characters in Japanese text can serve as reading aids for children or foreigners learning to read Kanji characters in Japanese.

Electronic readers, or eReaders, display electronic documents, such as eBooks, on a screen or other display and attempt to provide benefits of both a digital document and a print document. For example, many eReaders allow for different size fonts and can reflow text in an eBook to fill the screen of the eReader. Flowing and reflowing text refers to the arrangement of characters in lines on the display of an eReader, such that as the font size of the text changes, the lines of characters, the quantity of characters, and the positioning of the characters displayed are adjusted accordingly to fit the desired area on the display. Reflowing text can cause issues with ruby characters where the ruby characters are separated from their base characters on a different line or a different page, or part of a group of ruby characters flows to a new line and others do not, and so forth.

Traditional approaches to flowing and reflowing text in an eReader scenario typically consider word, line, or paragraph boundaries, and may not handle ruby characters correctly when flowing text.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 5 illustrates example text lines reflowed with jukugo ruby.

FIG. 6 illustrates example text lines reflowed with jukugo ruby and unjustified space at the end of the lines.

FIG. 7 illustrates example text lines reflowed with mono ruby and extra space at the end of the lines.

FIG. 8 illustrates example text lines reflowed with mono ruby and with extra space distributed among the characters.

FIG. 9 illustrates example text with jukugo ruby marked as mono ruby.

FIG. 10 illustrates example text with jukugo ruby marked as a single base ruby run.

DETAILED DESCRIPTION

Described herein are methods, systems and non-transitory computer-readable storage media for rendering ruby characters in an electronic reading device, or eReader. An eReader receives a document, such as a Japanese language document with ruby characters, and generates a text layout for rendering the document at a desired zoom level or font size, for example. The text layout can often introduce line breaks, page breaks, or other awkward splits of ruby characters and their associated base characters which hinder readability of the text. The eReader can rearrange the text layout according to the ruby characters to avoid splitting ruby characters inappropriately or to avoid placing adjacent base characters too close together so that their ruby characters overlap. Further, when the eReader rearranges the text layout, the eReader can adjust spacing and placement of other characters affected by the rearrangement, such as for improved readability.

The examples set forth herein are discussed in terms of Japanese text, but can be applied to any language having ruby characters. In Japanese text, for example, the base characters can be in one script, such as Kanji, and the ruby characters can be in a different script, such as Katakana. The system can process ruby characters in Japanese text by first identifying that a character is ruby, finding the correct base character for that ruby character, and grouping the base and ruby characters together if there is a run of ruby characters. Similarly, while the examples set forth herein are discussed in terms of an eReader or an eBook, other systems can also implement flow and reflow of text with ruby characters, such as a web browser executing on a laptop or any other computing device.

Figure 1:
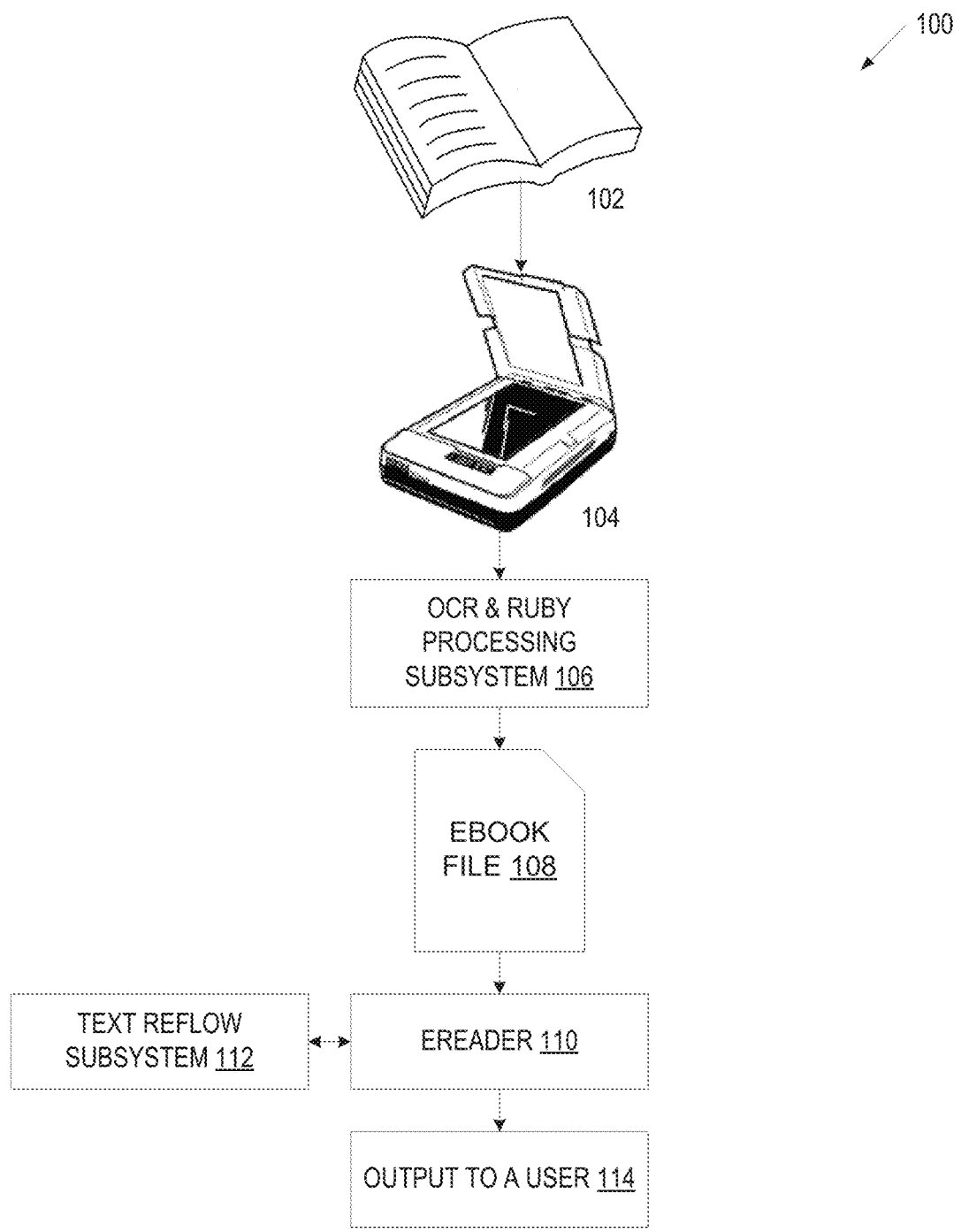
FIG. 1 illustrates an example architecture for generating and displaying eBooks with a text reflow subsystem.

FIG. 1 illustrates an example architecture 100 for adapting printed material for display on electronic devices. Printed text, in particular text of East Asian languages such as Japanese, is adapted for rendering on electronic displays or other suitable graphical display devices while maintaining the formatting and layout of the text as originally printed, including ruby characters. Printed material 102 contains the text as published. The printed material 102 may be a book, magazine, newspaper, poster, card, brochure, advertisement, or other physical object. Alternatively, the printed material 102 may be an electronic file that contains a representation of the text as it would be presented on a physical page. For example, the printed material 102 may be represented as a picture or page image such as, for example, a tagged image file format (TIFF) file, a JPEG file, or a portable document format (PDF) file.

In implementations in which the printed material 102 is a physical object such as a book, a scanner 104 may generate a scan (e.g., an image data file and/or other data files) from the printed material 102. The scanner 104 may be any device capable of capturing images including but not limited to a video camera, scanner, digital camera, copier, scanning pen, etc. The scanner 104 may include a coordinate system defined by the hardware of the scanner 104 that consists of numeric values for horizontal and vertical distances from a reference location on the scanner bed such as the top left corner. Thus, the scanner 104 may assign horizontal and vertical positions to images detected by the scanner 104 and the locations of images may be described in reference to arbitrary baselines such as the top edge or left edge of the scanner bed.

Scans generated by the scanner 104 may be image-based files of pages of the printed material 102, for example. The image-based representation may capture characters from the printed material 102 simply as images rather than as specific characters or letters of a particular language. These scans may be received by an optical character recognition (OCR) and ruby processing subsystem 106 for recognizing text or other characters in the images. In implementations in which the printed material 102 is an electronic file, the electronic file may be received by the OCR and ruby processing subsystem 106 directly without use of the scanner 104. In either implementation, the OCR and ruby processing subsystem 106 receives an electronic representation of text as it is intended to appear on a printed page.

The OCR and ruby processing subsystem 106 may be any type of computing device or multiple computing devices, such as a desktop computer system, a server, a supercomputer, a notebook computer, a tablet computer, an eBook reader, a smart phone and the like. The OCR and ruby processing subsystem 106 can include software modules, hardware modules, or a combination thereof. For example, the OCR and ruby processing subsystem 106 may include a geometry analysis module for analyzing geometric features of the text, such as character layout, margins, and the like.

The OCR and ruby processing subsystem 106 can identify ruby characters in the scanned material. Ruby is a small-sized, supplementary text attached to a base character or a group of base characters in the main text. A run of ruby text, usually attached to the right of base characters in vertical writing mode or immediately above the base characters in horizontal writing mode, indicates the reading or the meaning of those characters. Ruby characters can appear at other positions relative to the base character, such as to the left, right, above or below. While the examples set forth herein discuss specific examples of ruby characters, the same principles apply equally to other annotation characters, such as pinyin characters in Chinese text or romaja or kanj a characters in Korean text.

The OCR and ruby processing subsystem 106 can map the scanned page to the OCR results to see if the OCR has recognized all the characters on the page. The OCR and ruby processing subsystem 106 can divide the recognized characters into ruby and non-ruby characters. The OCR and ruby processing subsystem 106 generates an eBook file 108 as output that represents the characters in the printed material 102 in a digital form. An eReader 110 receives the eBook file 108 for rendering as output to a user 114. The eBook file 108 captures the appearance, spacing, layout, and other aspects of the text as the text appeared in the printed material 102 while still allowing the text to be reflowed and adjusted for display on different sizes of displays, different window sizes and at different levels of magnification or zoom. The eBook file 108 can include ruby characters, ruby runs, and ruby groups as generated by the OCR and ruby character processing subsystem 106. Although referred to as an eBook file 108, the eBook file 108 can alternatively contain text from any type of source document including but not limited to books, and can further contain images, animations, rendering preferences, formatting information, fonts, default settings such as a default page size and so forth.

Any number of display devices may then render the eBook file 108, such as a display screen of an eBook reader, or eReader 110, from which a consumer can view the text. Different display devices can render the same eBook file 108 differently due to differing screen sizes, zoom levels, available fonts, user preferences and so forth. The display devices incorporated into an eBook reader, a notebook computer, or other device rendering the eBook file 108 may be any type of typical display device such as a liquid crystal display, a cathode ray tube display, a bi-stable display (e.g., electronic ink), or the like. Display devices can render the eBook file via a software based eBook reader application, for example.

The eReader can include a text reflow subsystem 112 which manages the flow of text when the eReader renders text in the eBook file 108. A user can reflow the text, such as by a pinching gesture on a touch screen enabled device, making the text larger or smaller. In this case, the text reflow subsystem 112 adjusts the flow of text in the various lines of characters so that the new text size fits the space appropriately. Similarly, the text reflow subsystem 112 can adjust the flow of text when the display size or shape changes, such as when a device is rotated from landscape to portrait orientation. The text reflow subsystem 112 can ensure that ruby characters and their associated base characters are not split during such flows and reflows, and can further ensure that ruby character groups remain together. The text reflow subsystem 112 can also adjust the spacing of characters in a line of characters when a gap is produced in the line by moving a ruby character from one line to another. The text reflow subsystem 112 can further introduce additional spaces between adjacent base characters having ruby characters to avoid overlapping ruby characters.

Figures 2, 3:
FIG. 2 illustrates example Japanese characters.
FIG. 3 illustrates example Japanese characters in a vertical writing mode and in a horizontal writing mode.

FIG. 2 illustrates some example Japanese character types, including ideographic characters 202, hiragana characters 204 and katakana characters 206. Ideographic characters 202 can include kanji characters. The pronunciation of ideographic characters 202 may vary depending on context and adjacent characters. Hiragana characters 204 are generally phonetic. Katakana characters 206 are also generally phonetic, and are typically used to express words that are loaned from other languages. Base characters and ruby characters can be applied to any of these character types in Japanese, but can be found in other languages as well. Japanese characters can appear horizontally or vertically with various spacing. FIG. 3 illustrates example Japanese characters in a vertical writing mode 302 and in a horizontal writing mode 304. In some variations, the orientation of the text can provide an indication of the direction of page progression in a book, for example.

Figure 4:
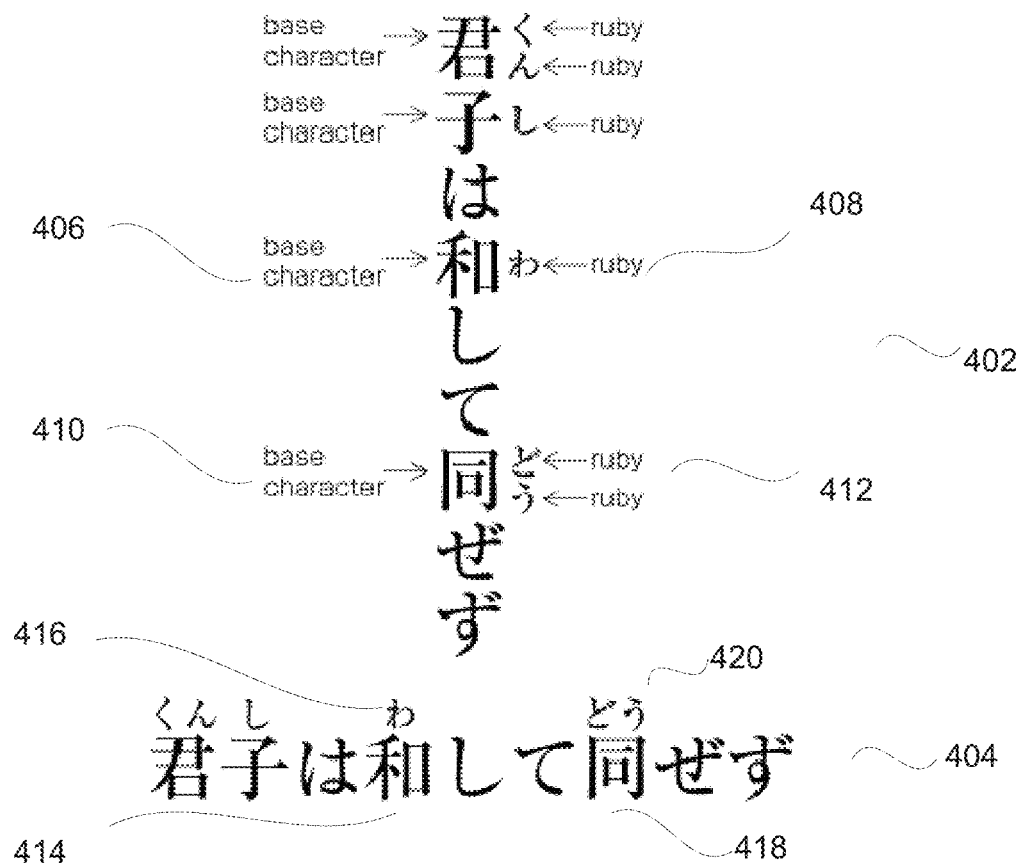
FIG. 4 illustrates example Japanese base characters and ruby characters.

FIG. 4 illustrates example Japanese base characters and ruby characters in a vertical orientation 402 and in a horizontal orientation 404. In the vertical orientation 402, a base character 406 can have a single ruby character 408 to the right, or a base character 410 can have multiple ruby characters 412 to the right. Similarly, a base character 414 can have a single ruby character 416 above the base character 414, or a base character 418 can have multiple ruby characters 420 above the base character 418 in the horizontal orientation 404.

Three example schemes for ruby layouts are mono ruby, jukugo ruby and group ruby. In mono ruby, ruby characters are set in connection with each base character so that the center of a ruby character generally matches the center of its associated base character. Ruby characters are distributed so that a single ruby character or a run of ruby characters is attached to a single base character.

In jukugo ruby, ruby characters are set not only in connection with each base character, but are also treated as a group as Kanji compound word. Thus, ruby characters are aligned to a group of base characters. Ruby characters are distributed among the group of base characters to provide reading for each Kanji character and to provide a united appearance attached to a word. A set of base characters can be a compound word to which a ruby character is mapped.

In group ruby, the connection between ruby characters and base characters is treated as group-to-group relationship, so that a ruby run of two or more characters is aligned with two or more base characters. Ruby characters are distributed such that the length of ruby text matches to that of the base text by giving the same adjusted amount of space between ruby characters. A group of ruby characters can be associated with a single base character, which is a mono ruby. Multiple mono rubies can be combined and represented in an electronic document as a group ruby.

Having discussed an example system for generating electronic documents and managing how ruby characters are flowed and reflowed while rendering the electronic documents, the disclosure now turns to some specific examples in FIGS. 5-8 of how base and ruby characters can be reflowed across page, line, or paragraph boundaries. These examples illustrate text in a vertical orientation, with lines proceeding from right to left. The principles set forth herein are equally applicable to text in a horizontal orientation or virtually any other text orientation and direction. FIG. 5 illustrates example text lines 500 reflowed with a jukugo ruby group of two base characters, with the first base character having three ruby characters and the second base character having three ruby characters. When jukugo ruby is marked with multiple base-ruby mappings, it can be displayed across reflow lines. In this example, the jukugo ruby, or compound word, includes two base characters 502, 504 and the corresponding ruby characters are associated with the individual base characters 502, 504. Thus, the system can split the two base characters 502, 504 apart because the ruby characters are independent of each other. In a similar embodiment, the two base characters 502, 504 can be adjacent, but separate, mono ruby groups each having a single base character and one or more ruby characters.

FIG. 6 illustrates example text lines 600 reflowed with a jukugo ruby group of two base characters and six ruby characters, and unjustified space at the end of the lines. In this case, the jukugo ruby is marked as a single base run and a single ruby run. In other words, the ruby characters do not map directly to individual base characters. Thus, when the system reflows this type of jukugo ruby, the system keeps the entire set of base and ruby characters together. In this example, the current line (on the right) is not long enough to accommodate the entire set. So the system moves the entire set of jukugo ruby 602 to the top of the next line, leaving a space 604 in the previous line. The system can determine how to best handle this space 604. In one embodiment, the system justifies the line, or evenly distributes the space among characters in the line. In another embodiment, the system leaves the space 604 at the bottom of the line as shown in FIG. 6. The system can determine how to treat the space 604 based on the size of the space and a desired threshold, such as the character size. For example, the system can choose to justify the line when the space is smaller than or equal to the combined length of two base characters, and choose to not justify the line when the space is greater than the combined length of two base characters.

FIG. 7 illustrates example text lines 700 reflowed with mono ruby 702 group of one base character and four ruby characters, and extra space 704 at the end of the lines. This mono ruby 702 includes four ruby characters associated with a single base character. Mono ruby 702 cannot fit at the end of the current line (on the right), so the system flows the mono ruby 702 to the next line, which leaves a space 704 at the bottom of the current line. In this case, as in FIG. 6, the system does not distribute the extra space 704 because the space is smaller than two base characters.

FIG. 8 illustrates example text lines 800 reflowed due to a mono ruby 802 group of one base character and three ruby characters. As with FIG. 7, reflowing the mono ruby 802 from the current line to the next line leaves extra space in the current line. However, in this case, the extra space is smaller than the desired threshold, which may be the combined length of two base characters, so the extra space is distributed evenly among the remaining characters 804 in the current line. This approach can provide enhanced readability.

FIGS. 9 and 10 illustrate how to flow ruby characters by introducing spaces or padding between adjacent base characters that have ruby characters to avoid overlapping ruby characters. FIG. 9 illustrates example text 900 with sets of jukugo base characters 902, 904 that are each individually marked as mono ruby. Jukugo base characters 902 have ruby characters that are shorter than the base characters, so the spacing between the two base characters 902 is unchanged. The run of ruby characters can be aligned to the center of the respective base character. One of the jukugo base characters 904 has three ruby characters that are longer than the base character. In order to avoid overlapping ruby or base characters, the system inserts additional space between the drawable base or ruby characters as a pad between a previous or following base character or ruby character. Thus, jukugo base characters 904 with padding are longer than jukugo base characters 902 without the padding. FIG. 10 provides another approach to avoiding overlapping characters.

FIG. 10 illustrates example text 1000 with jukugo ruby 1002 marked as a single base ruby run 1004. Jukugo base characters 1002 have ruby characters that are shorter than the base characters, so the spacing between the two base characters 1002 remains unchanged. At least one of the jukugo base characters 1004 has ruby characters that are longer than the base character, or the collection of ruby characters is longer than the collection of base characters. In order to avoid overlapping ruby or base characters, the system can merge the base characters 1004 as a single entity and associate the ruby characters with the single entity. The ruby characters, or ruby run, can be aligned to the merged base characters according to their relative position in the original text. Then the system can insert additional space around that entity as a pad between a previous or following base character or ruby character. Thus, the combination of characters 1004 with padding is longer than the other jukugo ruby characters 1002 without the padding. In one embodiment, the base characters are logically linked in the resulting eBook file, while the spacing and positioning of the base characters with respect to each other is preserved as they appear in the source document.

Figures 11, 12:
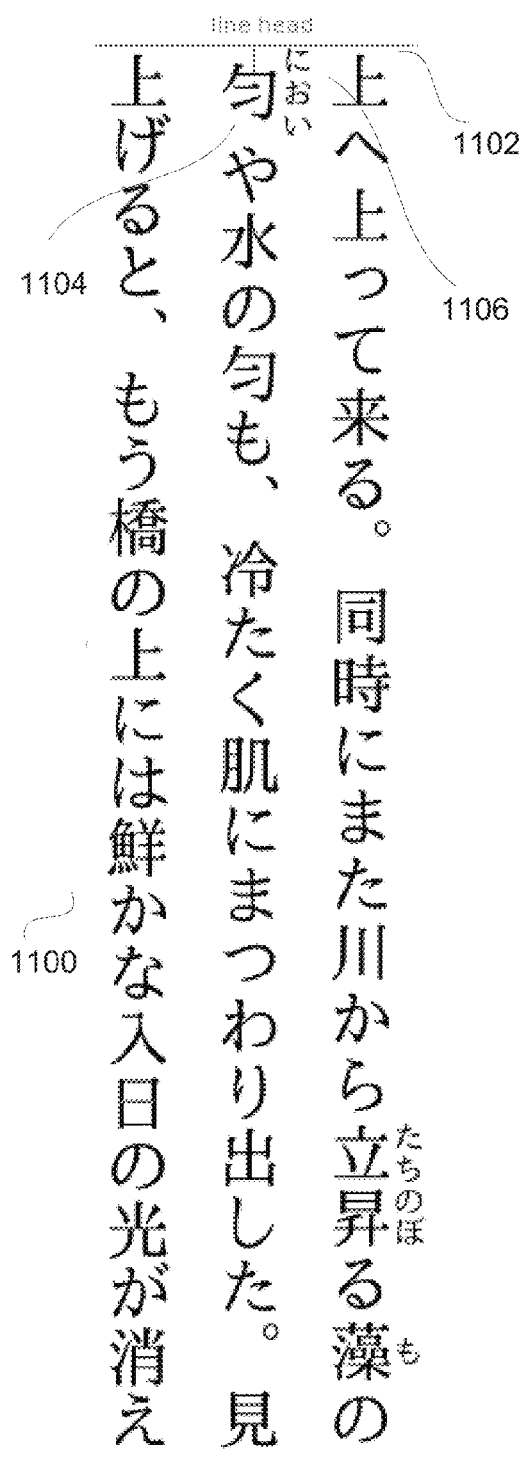
FIG. 11 illustrates vertical alignment of a base character and ruby characters at a line head.
FIG. 12 illustrates vertical alignment of a base character and ruby characters at a line end.

FIGS. 11 and 12 illustrate how to align base and ruby characters with margins at a line boundary. Specifically, FIG. 11 illustrates example text 1100 showing vertical alignment of a base character 1104 and ruby characters 1106 at a line head 1102, and FIG. 12 illustrates example text 1200 showing vertical alignment of a base character 1204 and ruby characters 1206 at a line end 1202. These examples illustrate positioning of runs of ruby characters 1106, 1206 longer than their respective base character 1104, 1204. The system can center align ruby characters to the base character, but when the base character, the ruby characters, or a combination of the base and ruby characters is greater than an expected size, or grid length, of a base character, then the system can deviate from the center alignment. For example, the system arranges base character 1104 down slightly, away from the line head 1102 so that the ruby characters are instead aligned to the line head 1102 or the margin. The text 1100 shows that all of the topmost characters, whether they are base or ruby characters, are aligned. The same general principle applies to ruby characters exceeding the expected size of a base character at the line end 1202, only the base character is moved up instead of down to accommodate the ruby characters. The system can make these position determinations for ruby and base characters as text is being reflowed, and as characters are placed at or removed from the line head 1102 or line end 1202.

Figure 13:
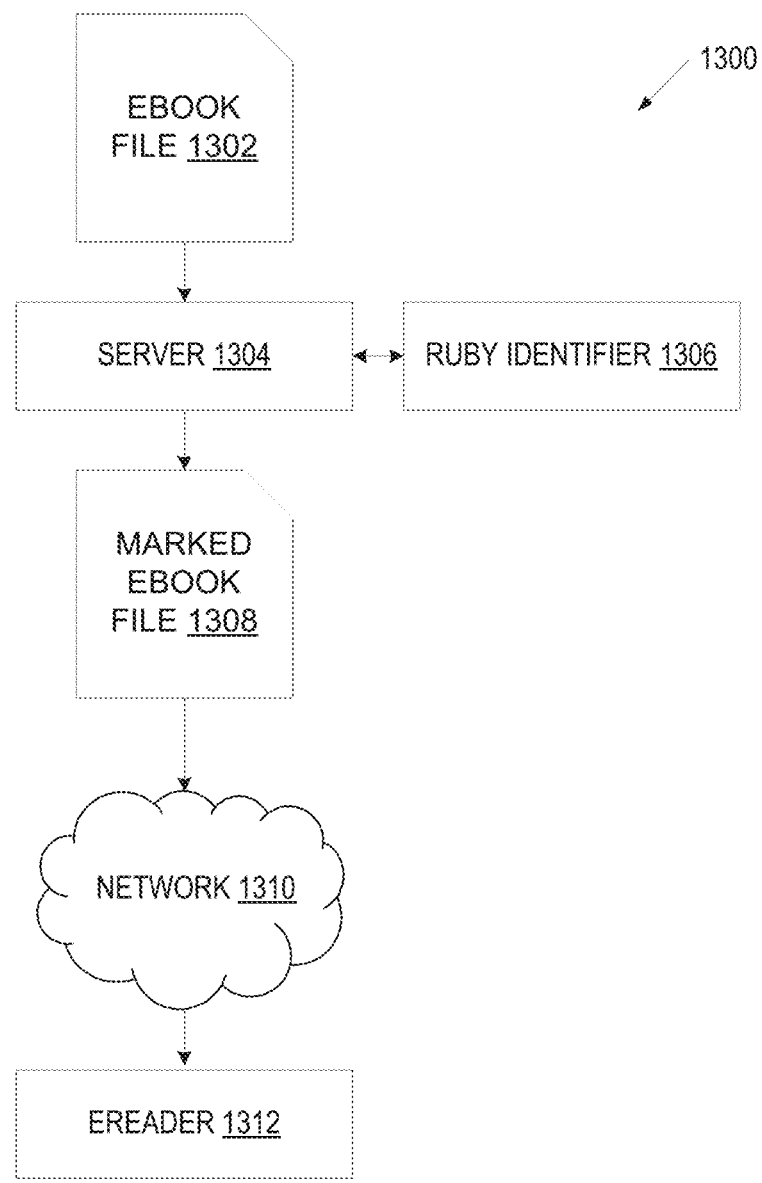
FIG. 13 illustrates a block diagram of inserting markings for ruby characters in an eBook for instructing a rendering device how to render the ruby characters.

FIG. 13 illustrates a block diagram of an example architecture 1300 for inserting markings for ruby characters in an eBook file 1302 for instructing a rendering device, such as an eReader 1312, how to render, flow, or reflow ruby characters in the eBook. A server 1304 ingests an eBook file 1302, or, in one embodiment, creates an eBook file 1302 as shown in FIG. 1. A ruby identifier 1306 identifies ruby characters in the eBook file, such as by parsing contents of the eBook file, by identifying character sizes, based on character positions and so forth. In one embodiment, the ruby identifier 1306 takes optical character recognition (OCR) output identifying base characters, and identifies regions in which ruby characters can be expected according to a ruby character placement standard. The ruby identifier 1306 can optionally analyze the layout of the ruby in the source material to determine a type of the ruby, whether the ruby is mono ruby, group ruby, or jukugo ruby, for example. In one embodiment, the ruby identifier 1306 reads data already stored in the eBook file 1302 to identify the type of ruby characters. The ruby identifier 1306 can be a system that analyzes the data in the eBook file 1302, or ruby characters can be identified based on user input 1314 from a human user that manually identifies ruby characters or provides updates or changes to what the ruby identifier 1306 identifies. For example, the ruby identifier 1306 can recognize two adjacent base characters as part of a jukugo ruby group, and the human can proofread how the system recognized and classified the characters. If the human finds an error, the human user can provide user input 1314 indicating a corrected ruby identification, such as splitting the improperly identified jukugo ruby group. Similarly, the user input 1314 can merge characters into a jukugo ruby group, or add or delete ruby identifications.

The server processes the ruby character identifications and types of ruby characters to either generate a new marked eBook file 1308 or modify the eBook file 1302 by inserting markings describing the ruby characters, ruby character groups, ruby character associations with base characters, or whether a set of ruby characters should stay together across a line or page boundary. The markings can be annotations, metadata, markup tags, or bit strings, for example. In one embodiment, the markings are stored as a separate file that augments the eBook file 1302. Then an eReader 1312 receives the marked eBook file 1308, such as over a network 1310, and can render the marked eBook file 1308.

The markings provide explicit indications to the eReader 1312 for how to render the ruby characters when flowing or reflowing text. As such, the markings may be read by the eReader 1312 and used as instructions for processing the text without displaying the markings to a user. However, the markings can be available for viewing in a debugging mode or detailed reading mode, for example. For example, the markings can instruct the eReader 1312 to split or not split certain base and ruby character groups at line boundaries, as shown in FIGS. 5-8. The markings can instruct the eReader 1312 to insert additional spacing or padding between certain adjacent characters, as shown in FIGS. 9-10. The markings can instruct the eReader 1312 to align base and ruby characters at a line head or line end, as shown in FIGS. 11-12. The markings can be incorporated as instructions to a flow engine on the eReader 1312, or can be incorporated directly into the document as formatting information. Then, when the eReader 1312 renders or flows the text in the eBook and encounters markings or instructions for a ruby character, the eReader 1312 adjusts the layout and rendering of the ruby characters and associated base characters accordingly.

Figure 14:
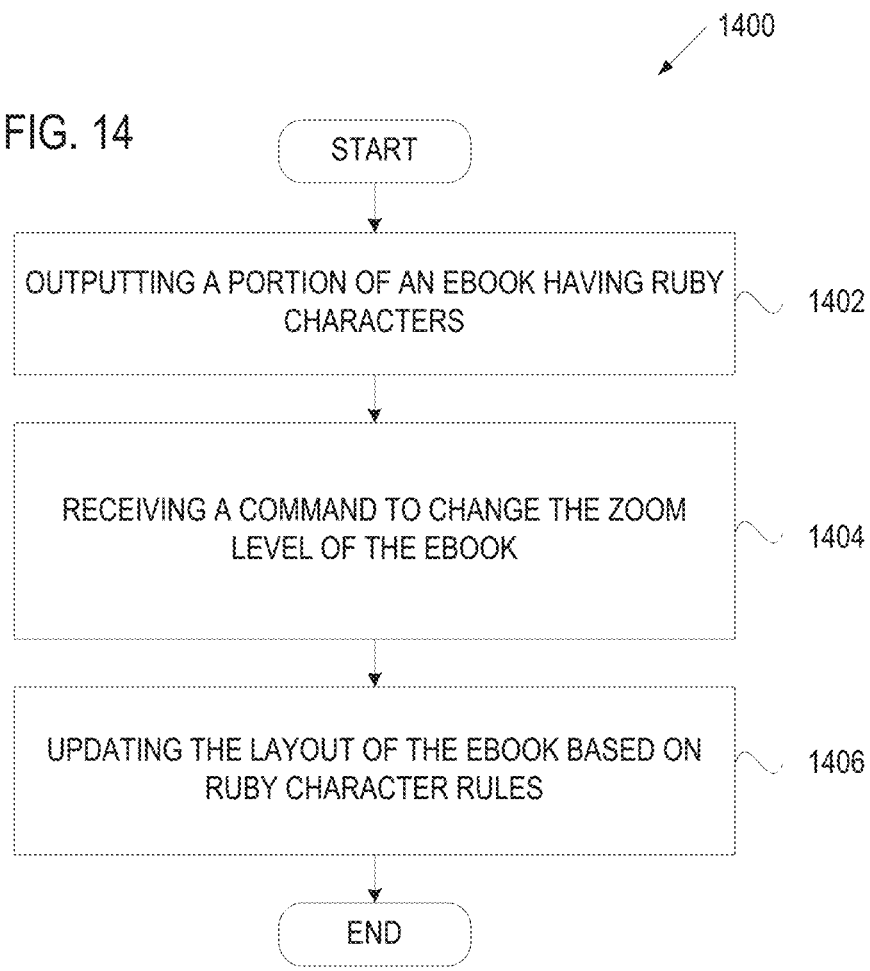
FIG. 14 illustrates a flow diagram of one embodiment of a method for flowing text having ruby characters.

FIG. 14 illustrates a flow diagram 1400 of one embodiment of a method for flowing text having ruby characters. An example system configured in accordance with one embodiment outputs, at a first zoom level, and in a first text layout of lines of base and ruby characters, an electronic document on a display of an electronic reading device (1402). Then the system receives a command to change from the first zoom level to a second zoom level (1404). The command can correspond to user input such a pinch gesture, scrolling input, one or more taps, a button press, or a voice command, for example.

The system determines, for the second zoom level, a second text layout, and modifies the second text layout based on line boundary rules associated with the ruby characters. The line boundary rules can include allowing a line or page break between two base jukugo characters when each of the corresponding ruby characters are associated with only one of the two base jukugo characters, and prohibiting a line or page break between two base jukugo characters when the corresponding ruby characters are associated with both base characters. Other types of line boundary rules can be implemented, and several line boundary rules can stack so that multiple rules are being implemented for the same characters. In one embodiment, the system identifies, using a rule, a group of ruby characters at a line boundary that are associated with a base character, and that are longer than the base character. The system can adjust positions of the base character and the group of ruby characters so that the group of ruby characters aligns with an adjacent margin and the base character is centered with the group of ruby characters. In another embodiment, the system identifies, in the second text layout, a line of characters with empty space, wherein the line of characters is associated with a grid length, and wherein the grid length defines a character size. If a size of the empty space is shorter than a threshold such as two times the grid length, the system distributes the empty space evenly between characters in the line of characters, and if the size of the empty space is equal to or greater than the threshold, the system places the empty space at an end of the line of characters. Other rules can provide different adjustments for splitting or merging ruby and base characters across line boundaries, spacing of adjacent base characters with ruby characters, placement of base characters and ruby characters at line heads and line ends, and so forth. The rules can be determined at the eBook generation time or thereafter. In one embodiment, the rules are generated entirely or partially based on user preferences for displaying ruby characters. For example, a user can establish rules for display on his or her local device which can override rules established when the eBook is generated when the eBook is displayed on that local device.

In one embodiment, the system can render a same set of ruby characters differently. A jukugo ruby has three base characters b1, b2 and b3. The system can flow the entire set of three base characters together so that no line or page boundaries split b1, b2, and b3. However, if ruby characters r1 and r2 are tied to b1, r3 and r4 are tied to b2, and r5 and r6 are tied to b3, then the user or other entity can indicate that the jukugo ruby can be split by base character so that the ruby characters remain with their respective base characters. This can be a personal preference of the user, or the system can detect what types of settings should be available for the user to select for displaying and potentially splitting the base characters in the jukugo ruby.

Figure 15:
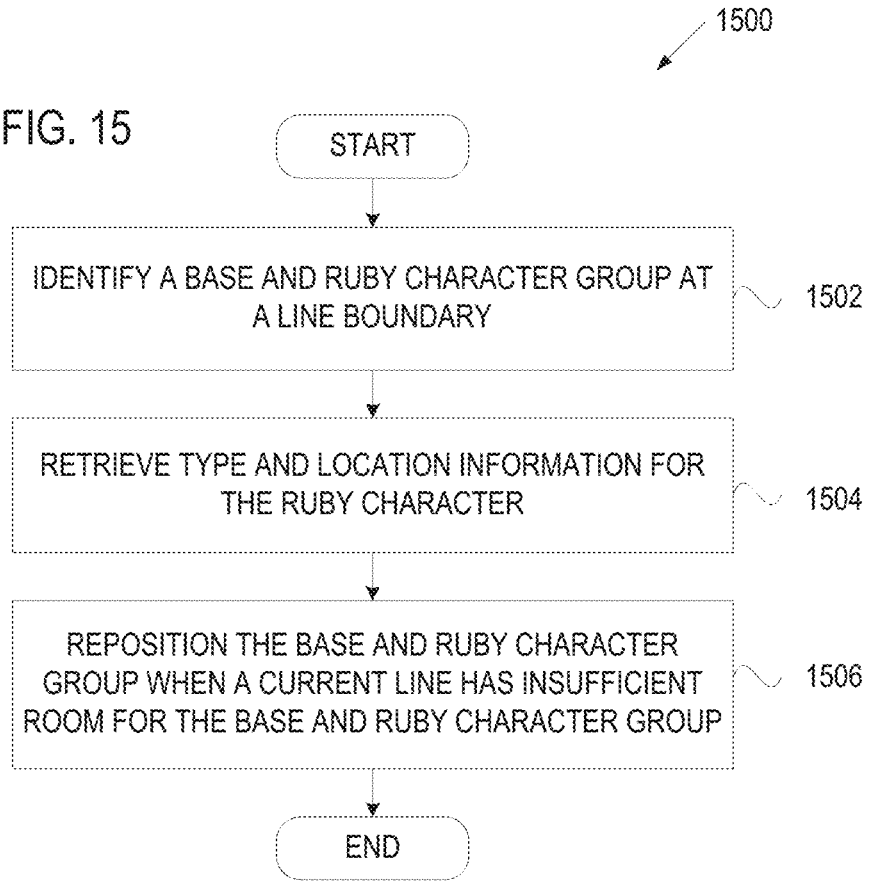
FIG. 15 illustrates a flow diagram of one embodiment for updating a layout of reflowed text with ruby characters.

The system updates the display of the electronic reading device to output a second portion of the electronic document at the second zoom level and in the second text layout (1406). FIG. 15 illustrates a flow diagram 1500 of one embodiment for updating a layout of reflowed text with ruby characters, as in step 1406 of FIG. 14. The system identifies a ruby character at a boundary of a line in a text layout for an electronic document (1502), and identifies or retrieves a type of the ruby character (1504) and optionally retrieves location or positioning information for the ruby character. Based on the type and the location or positioning information, the system repositions the ruby character and an associated base character within the line or within an adjacent line. FIGS. 5-8 provide several examples of repositioning ruby characters across lines, as well as adjusting spacing of remaining characters in the lines.

Figure 16:
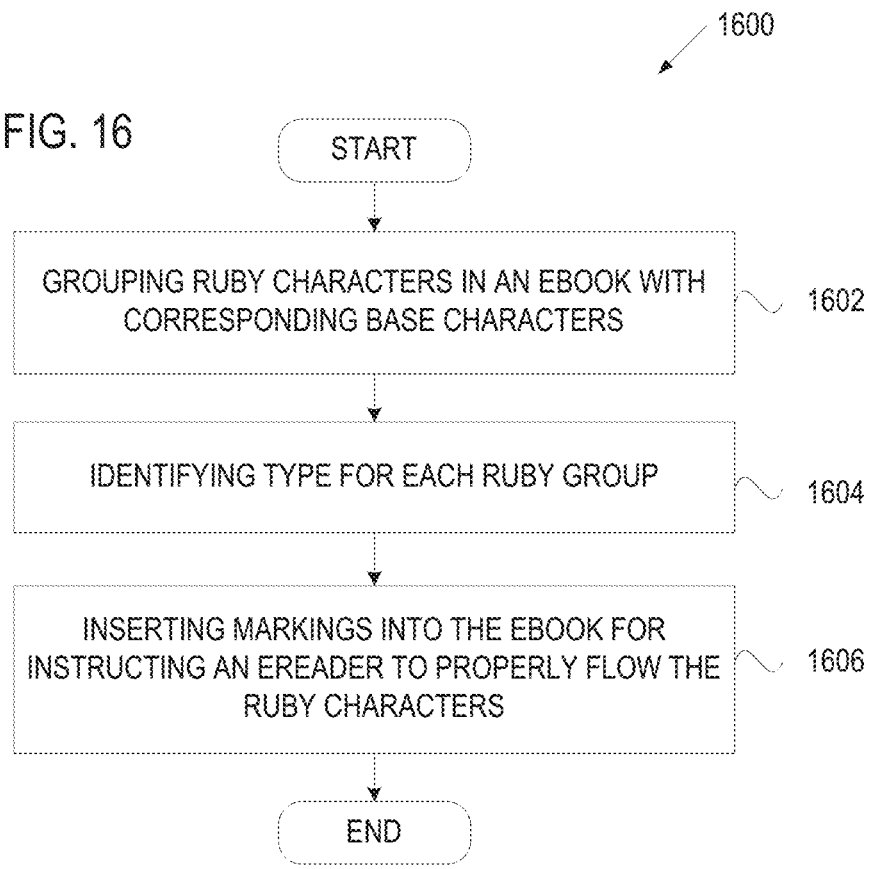
FIG. 16 illustrates a flow diagram of one embodiment for inserting markings for ruby characters in an eBook.

FIG. 16 illustrates a flow diagram 1600 of one embodiment for inserting markings for ruby characters in an eBook. The system identifies ruby characters in an electronic document, wherein each ruby character is associated with at least one base character, and assembles ruby characters in the document into groups, wherein each group comprises one or more base character and one or more ruby character (1602). The system identifies a respective ruby type for each group (1604), such as mono ruby, group ruby, or jukugo ruby, and inserts markings in the electronic document for the groups based on the respective ruby type for each group (1606). The markings can indicate to an eReader how to render the ruby characters when flowing the text for output.

When the eReader renders text in an eBook with such markings indicating how to render groups of ruby characters generated based on ruby types of the groups of ruby characters, the eReader generates a rendering layout of the base characters and the ruby characters based on the markings, and renders at least a portion of the electronic document according to the rendering layout. The markings can indicate how to position base characters and associated ruby characters at line boundaries and/or how to space base characters and associated ruby characters. Each marking can be associated with at least one base character and at least one ruby character. In one embodiment, the system identifies a group of ruby characters at a line boundary in the rendering layout, and retrieves a marking for the group of ruby characters. Then the system can reposition the group of ruby characters and an associated base character to an adjacent line when the current line has insufficient room to display the base character and the ruby characters.

In one embodiment, the user can instruct the eReader to disable the display of ruby characters entirely. For example, the ruby characters may be intended as a reading aid for those who are learning to read a particular script, such as Kanji. If the reader is proficient at reading Kanji, then the user does not need to see the ruby characters, and the ruby characters can be a distraction. In this case, the user can select a menu option to disable or turn off ruby characters. The eReader can not only refrain from displaying the ruby characters, but can also undo or prevent any adjustments to spacing, alignment, or characters at line boundaries which were based on displaying ruby characters. For example, the system would no longer need to pull back a base character from a line head or line end, as shown in FIGS. 11 and 12 when ruby characters are turned off, and the base character can align with the line head or line end.

Figure 17:
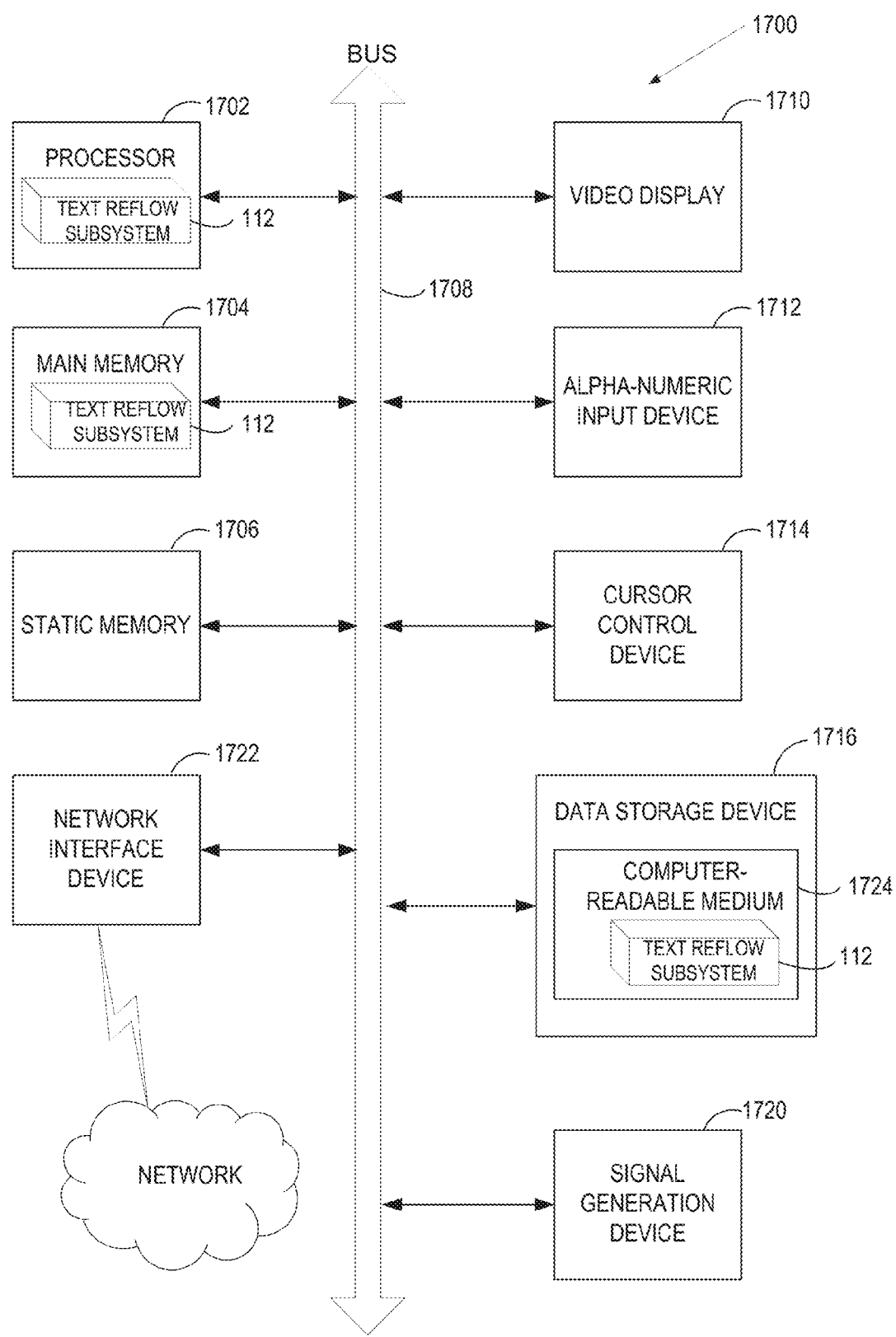
FIG. 17 illustrates a block diagram of one embodiment of a user device.

FIG. 17 illustrates a diagrammatic representation of a machine in the exemplary form of a computer system 1700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1700 includes a processing device 1702, a main memory 1704 (e.g., read-only memory (ROM), flash memory, dynamic random access memory (DRAM) such as synchronous DRAM (SDRAM) or Rambus DRAM (RDRAM), etc.), a static memory 1706 (e.g., flash memory, static random access memory (SRAM), etc.), and a secondary memory 1716 (e.g., a data storage device), which communicate with each other via a bus 1708.

Processing device 1702 represents one or more general-purpose processing devices such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. Processing device 1702 is configured to execute processing logic (e.g., instructions 1726) for performing the operations and steps discussed herein.

The computer system 1700 may further include a network interface device 1722. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), other user input device such as a touch screen or a microphone, and a signal generation device 1720 (e.g., a speaker).

The secondary memory 1716 may include a machine-readable storage medium (or more specifically a computer-readable storage medium) 1724 on which is stored one or more sets of instructions 1726 embodying any one or more of the methodologies or functions described herein. The instructions 1726 may also reside, completely or at least partially, within the main memory 1704 and/or within the processing device 1702 during execution thereof by the computer system 1700, the main memory 1704 and the processing device 1702 also constituting machine-readable storage media.

The computer-readable storage medium 1724 may also be used to store instructions which may correspond to the text reflow subsystem 112 of FIG. 1, and/or a software library containing methods that call a text reflow subsystem 112. While the computer-readable storage medium 1724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories and optical and magnetic media.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "outputting", "receiving", "determining", "modifying", "rendering", "repositioning", "assembling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   outputting, via a processing device, at a first zoom level, and in a first text layout comprising lines of characters, a first portion of an electronic document on a display of an electronic reading device, wherein the electronic document contains text with base characters and corresponding ruby characters, and wherein the first text layout comprises a first base character at a first position in the first text layout and a corresponding first ruby character at a second position in the first text layout;
   receiving, via the processing device, a command to change from the first zoom level to a second zoom level;
   determining, via the processing device and for the second zoom level, a second text layout, wherein the second text layout comprises the first base character at a third position in the second text layout and the corresponding first ruby character at a fourth position in the second text layout; and
   identifying, via the processing device, additional changes to positions of the first base character and the first ruby character in the second text layout based at least in part on line boundary rules associated with the ruby character at the fourth position;
   modifying the second text layout based at least in part on the additional changes to the position of the first base character and the first ruby character; and
   updating the display of the electronic reading device to output a second portion of the electronic document at the second zoom level and in the second text layout.

2. The method of claim 1, wherein modifying the second text layout based at least in part on line boundary rules further comprises:
- identifying, at a line boundary, a group of ruby characters associated with a base character, wherein the group of ruby characters is longer than the base character; and
- adjusting positions of the base character and the group of ruby characters so that the group of ruby characters aligns with an adjacent margin and the base character is centered with the group of ruby characters.

3. The method of claim 1, further comprising:
- identifying, in the second text layout, a line of characters with empty space, wherein the line of characters is associated with a grid length, and wherein the grid length defines a character size;
- determining that a size of the empty space is shorter than two times the grid length; and
- distributing the empty space evenly between characters in the line of characters.

4. The method of claim 1, wherein the command comprises at least one of a pinch gesture, scrolling input, one or more taps, a button press, or a voice command.

5. A system comprising:
- a processing device;
- a memory having stored therein instructions which, when executed by the processing device, cause the processing device to:
  - identify an annotation character at a boundary of a line in a text layout for an electronic document;
  - identify a type of the annotation character, wherein the type of the annotation character comprises at least one of a mono ruby, a group ruby, or a jukugo ruby; and
  - based at least in part on the type, reposition the annotation character and an associated base character within the line or within an adjacent line; and
  - insert a marking in the electronic document for the annotation character based at least in part on the type, wherein the marking comprises metadata instructions that indicate how to render the annotation character.

6. The system of claim 5, wherein the type comprises the group ruby, and wherein the instructions, when executed by the processing device, further cause the processing device to:
- reposition all base characters and annotation characters that are part of the group ruby together.

7. The system of claim 5, wherein the type comprises the jukugo ruby with a base run and a ruby run, and wherein the instructions, when executed by the processing device, further cause the processing device to:
- reposition the base run and the ruby run as a unit.

8. The system of claim 7, wherein the instructions, when executed by the processing device, further cause the processing device to:
- full justify remaining characters in the line when the base run and the ruby run are repositioned to the adjacent line.

9. The system of claim 5, wherein the type comprises the jukugo ruby marked with multiple base character and ruby character mappings, and wherein the instructions, when executed by the processing device, further cause the processing device to:
- position a first base character of the jukugo ruby and ruby characters associated with the first base character of the jukugo ruby on the line; and
- position a second base character of the jukugo ruby and ruby characters associated with the second base character of the jukugo ruby on the adjacent line.

10. The system of claim 5, wherein the type comprises the mono ruby with multiple ruby characters, and wherein the instructions, when executed by the processing device, further cause the processing device to:
- determine a ruby length of the multiple ruby characters and a base length of a base character associated with the multiple ruby characters; and
- when the ruby length is greater than the base length, reposition the multiple ruby characters to align with a margin, and reposition the base character based at least in part on the multiple ruby characters.

11. The system of claim 5, wherein the instructions, when executed by the processing device, further cause the processing device to:
- identify adjacent base characters having respective associated annotation characters; and
- insert additional space between the adjacent base characters to prevent the respective associated annotation characters from overlapping.

12. The system of claim 5, wherein the text layout comprises one of vertical text or horizontal text.

13. A non-transitory computer-readable storage medium having stored therein instructions which, when executed by a processing device, cause the processing device to perform operations comprising:
- identifying ruby characters in an electronic document, wherein each ruby character is associated with at least one base character;
- assembling ruby characters in the electronic document into a plurality of groups, wherein each group comprises one or more base characters and one or more ruby characters;
- identifying, by the processing device, a respective ruby type for each group of the plurality of groups, wherein the ruby type comprises at least one of a mono ruby, a group ruby, or a jukugo ruby; and
- inserting, by the processing device, a marking in the electronic document for a group of the plurality of groups based at least in part on the respective ruby type for the group, wherein the marking comprises metadata instructions that indicate how to render the one or more ruby characters in the group when flowing the electronic document for output.

14. The non-transitory computer-readable storage medium of claim 13, wherein the respective ruby type indicates ruby placement on one or both sides of a base character.

15. The non-transitory computer-readable storage medium of claim 13, wherein the marking inserted in the electronic document further comprises at least one of annotations, markup tags, or bit strings.

16. The non-transitory computer-readable storage medium of claim 13, wherein the marking is not displayed when outputting the electronic document.

17. The non-transitory computer-readable storage medium of claim 13, wherein the marking is configured to instruct an output device rendering the electronic document regarding at least one of how to position base characters and associated ruby characters at line boundaries or how to space base characters and associated ruby characters.

18. A method comprising:
- receiving, via a processing device, an electronic document having base characters, ruby characters, and markings comprising metadata instructions indicating how to render groups of ruby characters, wherein the markings are generated based at least in part on ruby types of the groups of ruby characters, and wherein the ruby types comprise at least one of a mono ruby, a group ruby, or a jukugo ruby;

generating, via the processing device, a rendering layout of the base characters and the ruby characters based at least in part on the markings; and rendering, via the processing device, at least a portion of the electronic document according to the rendering layout.

19. The method of claim 18, wherein the markings indicate at least one of how to position base characters and associated ruby characters at line boundaries or how to space base characters and associated ruby characters.

20. The method of claim 18, wherein each marking links at least one base character with at least one ruby character.

21. The method of claim 18, wherein generating the rendering layout further comprises:

identifying a group of ruby characters at a line boundary in the rendering layout;

retrieving a marking for the group of ruby characters; and repositioning the group of ruby characters and an associated base character to an adjacent line.

\* \* \* \* \*